(12) United States Patent
Kim et al.

(10) Patent No.: US 11,343,072 B2
(45) Date of Patent: May 24, 2022

(54) METHOD AND APPARATUS FOR PROVIDING SERVICE USING KIOSK

(71) Applicant: ELECTRONICS AND TELECOMMUNICATIONS RESEARCH INSTITUTE, Daejeon (KR)

(72) Inventors: Seok Hyun Kim, Daejeon (KR); Sangrae Cho, Daejeon (KR); Young Seob Cho, Daejeon (KR); Soo Hyung Kim, Daejeon (KR); Seung-Hyun Kim, Daejeon (KR); Youngsam Kim, Daejeon (KR); Jong-Hyouk Noh, Daejeon (KR); Kwantae Cho, Daejeon (KR); Jin-Man Cho, Daejeon (KR); Seung Hun Jin, Daejeon (KR); Jung Yeon Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 137 days.

(21) Appl. No.: 16/743,781

(22) Filed: Jan. 15, 2020

(65) Prior Publication Data

US 2020/0228320 A1 Jul. 16, 2020

(30) Foreign Application Priority Data

Jan. 15, 2019 (KR) .................. 10-2019-0005424

(51) Int. Cl.
*H04L 29/06* (2006.01)
*H04L 9/06* (2006.01)
(Continued)

(52) U.S. Cl.
CPC .............. *H04L 9/0637* (2013.01); *H04L 9/30* (2013.01); *H04L 9/3213* (2013.01); *H04L 2209/38* (2013.01)

(58) Field of Classification Search
CPC ....... H04L 9/0637; H04L 9/30; H04L 9/3213; H04L 2209/38
(Continued)

(56) References Cited

U.S. PATENT DOCUMENTS

2013/0117273 A1  5/2013  Lee et al.
2018/0146026 A1  5/2018  Raboin
(Continued)

FOREIGN PATENT DOCUMENTS

KR  101611872 B1  4/2016
KR  101678795 B1  11/2016

OTHER PUBLICATIONS

Sung-Hoon Lee et al., "Device authentication in Smart Grid System using Blockchain", CISC-W'16, Dec. 3, 2016,Yonsei University, Seoul. https://caislab.kaist.ac.kr/publication/paper_files/2016/CISCW_SH.pdf; English Abstract.

*Primary Examiner* — Evans Desrosiers
(74) *Attorney, Agent, or Firm* — Rabin & Berdo, P.C.

(57) ABSTRACT

A method and an apparatus for providing a service using a kiosk by a service providing server by performing the steps of: receiving a device list of at least one kiosk having an ability to provide the service among a plurality of kiosks registered in a blockchain from a kiosk server; authenticating a first kiosk through a smart contract function embedded in the blockchain when a user requests the service through the first kiosk and determining whether the first kiosk is included in the device list; and providing the service to the user when the first kiosk is authenticated by the smart contract function and is included in the device list are provided.

14 Claims, 10 Drawing Sheets

(51) Int. Cl.
*H04L 9/32* (2006.01)
*H04L 9/30* (2006.01)

(58) Field of Classification Search
USPC .......................................................... 713/159
See application file for complete search history.

(56) References Cited

U.S. PATENT DOCUMENTS

| | | |
|---|---|---|
| 2018/0198794 A1 | 7/2018 | Huh et al. |
| 2018/0248880 A1* | 8/2018 | Sardesai ............... H04L 9/3239 |
| 2018/0254905 A1 | 9/2018 | Chun |
| 2020/0250676 A1* | 8/2020 | Sierra ..................... H04L 9/302 |

* cited by examiner

FIG. 7

| Key | Value |
|---|---|
| AAGUID | Metadata Statement |
| DeviceID | crypto(Attestation, AAGUID, credentialId) |
| credentialId | PublicKey |
| kioskProviderId | PublicKey |
| serviceProviderId | PublicKey |

FIG. 8

| Item | Contents |
|---|---|
| kioskProviderId | identifier of kiosk provider |
| deviceID | identifier of kiosk |
| credentialId | identifier of public key |
| credentialType | type of public key |

METHOD AND APPARATUS FOR PROVIDING SERVICE USING KIOSK

CROSS-REFERENCE TO RELATED APPLICATION

This application claims priority to and the benefit of Korean Patent Application No. 10-2019-0005424 filed in the Korean Intellectual Property Office on Jan. 15, 2019, the entire contents of which are incorporated herein by reference.

BACKGROUND OF THE INVENTION (a) Field of the Invention

This relates to a method and apparatus for providing a service using a kiosk authenticated through a blockchain.

(b) Description of the Related Art

In general, kiosk devices used in non-face-to-face services are spread as devices specialized for specific services for security reasons. This results in the user contacting different kiosk interfaces for each service. In addition, operating costs such as function updates for individual kiosk devices can be increased.

SUMMARY OF THE INVENTION

An exemplary embodiment provides a method for providing a service using a kiosk.

Another exemplary embodiment provides an apparatus for providing a service using a kiosk.

Yet another exemplary embodiment provides a method for registering a kiosk to a blockchain.

According to an exemplary embodiment, a method for providing a service using a kiosk by a service providing server is provided. The method includes: receiving a device list of at least one kiosk having an ability to provide the service among a plurality of kiosks registered in a blockchain from a kiosk server; authenticating a first kiosk through a smart contract function embedded in the blockchain when a user requests the service through the first kiosk and determining whether the first kiosk is included in the device list; and providing the service to the user when the first kiosk is authenticated by the smart contract function and is included in the device list.

The receiving a device list of at least one kiosk having an ability to provide the service among a plurality of kiosks registered in a blockchain from a kiosk server may include: receiving a kiosk list encrypted with a public key of a service provider from the kiosk server and decrypting encrypted kiosk list based on a private key of the service provider; and verifying kiosks in the kiosk list by invoking a verification smart contract function of the blockchain and managing verified kiosks using the device list.

The device list may include an identifier of a kiosk provider, an identifier of a kiosk, an identifier of a public key of the kiosk, and a type of the public key of the kiosk.

The identifier of the kiosk provider may be used when a verification smart contract function of the blockchain which is invoked by the service providing server queries the public key of the kiosk provider in a data block of the blockchain.

The identifier of the public key of the kiosk may be used when an authentication smart contract function of the blockchain which is invoked by the service providing server queries the public key of the kiosk in a data block of the blockchain.

The providing the service to the user when the first kiosk is authenticated by the smart contract function and is included in the device list may include: transmitting an authentication token for providing the service to the first kiosk; and providing the service by verifying the authentication token received from the first kiosk when a function of the service is requested through the authentication token from the first kiosk.

According to another exemplary embodiment, a server which provides a service using a kiosk is provided. The server includes: a processor, a memory, and a communication device, wherein the processor executes a program stored in the memory to perform: receiving a device list of at least one kiosk having an ability to provide the service among a plurality of kiosks registered in a blockchain through the communication device from a kiosk server; authenticating a first kiosk through a smart contract function embedded in the blockchain when a user requests the service through the first kiosk and determining whether the first kiosk is included in the device list; and providing the service to the first kiosk through the communication device so that the service is used by the user when the first kiosk is authenticated by the smart contract function and is included in the device list.

When the processor performs the receiving a device list of at least one kiosk having an ability to provide the service among a plurality of kiosks registered in a blockchain from a kiosk server, the processor may perform: receiving a kiosk list encrypted with a public key of a service provider from the kiosk server and decrypting encrypted kiosk list based on a private key of the service provider; and verifying kiosks in the kiosk list by invoking a verification smart contract function of the blockchain and managing verified kiosks using the device list.

The device list may include an identifier of a kiosk provider, an identifier of a kiosk, an identifier of a public key of the kiosk, and a type of the public key of the kiosk.

The identifier of the kiosk provider may be used when a verification smart contract function of the blockchain which is invoked by the service providing server queries the public key of the kiosk provider in a data block of the blockchain.

The identifier of the public key of the kiosk may be used when an authentication smart contract function of the blockchain which is invoked by the service providing server queries the public key of the kiosk in a data block of the blockchain.

When the processor performs the providing the service to the user when the first kiosk is authenticated by the smart contract function and is included in the device list, the processor may perform: transmitting an authentication token through the communication device for providing the service to the first kiosk; and providing the service by verifying the authentication token received from the first kiosk when a function of the service is requested through the authentication token from the first kiosk.

According to yet another exemplary embodiment, a kiosk server which manages a kiosk providing a service to a user is provided. The kiosk server includes: a processor, a memory, and a communication device, wherein the processor executes a program stored in the memory to perform: authenticating an administrator by requesting an authentication to the administrator of the kiosk when a registration request for the blockchain is received from the kiosk; receiving a registration response message from the kiosk when the administrator is authenticated; and verifying the registration response message by invoking a registration smart contract function of the blockchain and receiving a registration completion message indicating that a registration of the kiosk is completed from the blockchain when the registration response message is verified by the registration smart contract function.

When the processor performs the authenticating an administrator by requesting an authentication to the administrator of the kiosk when a registration request for the blockchain is received from the kiosk, the processor may perform verifying an authentication device of the administrator based on an identifier of the administrator included in an authentication response when the authentication response corresponding to the requesting is received from the administrator, wherein the authentication device has been connected to the kiosk by the administrator.

Authentication information of the kiosk recorded in a data block of the blockchain when the kiosk is registered to the blockchain may include an identifier of the kiosk and an identifier of a public key of the kiosk.

BRIEF DESCRIPTION OF THE DRAWINGS

FIG. 7 is a schematic diagram illustrating authentication information of a kiosk recorded in a data block of a FIDO blockchain according to an exemplary embodiment.

FIG. 8 is a schematic diagram illustrating a device list of a kiosk managed by a service providing server according to an exemplary embodiment.

DETAILED DESCRIPTION OF THE EMBODIMENTS

Figure 1:
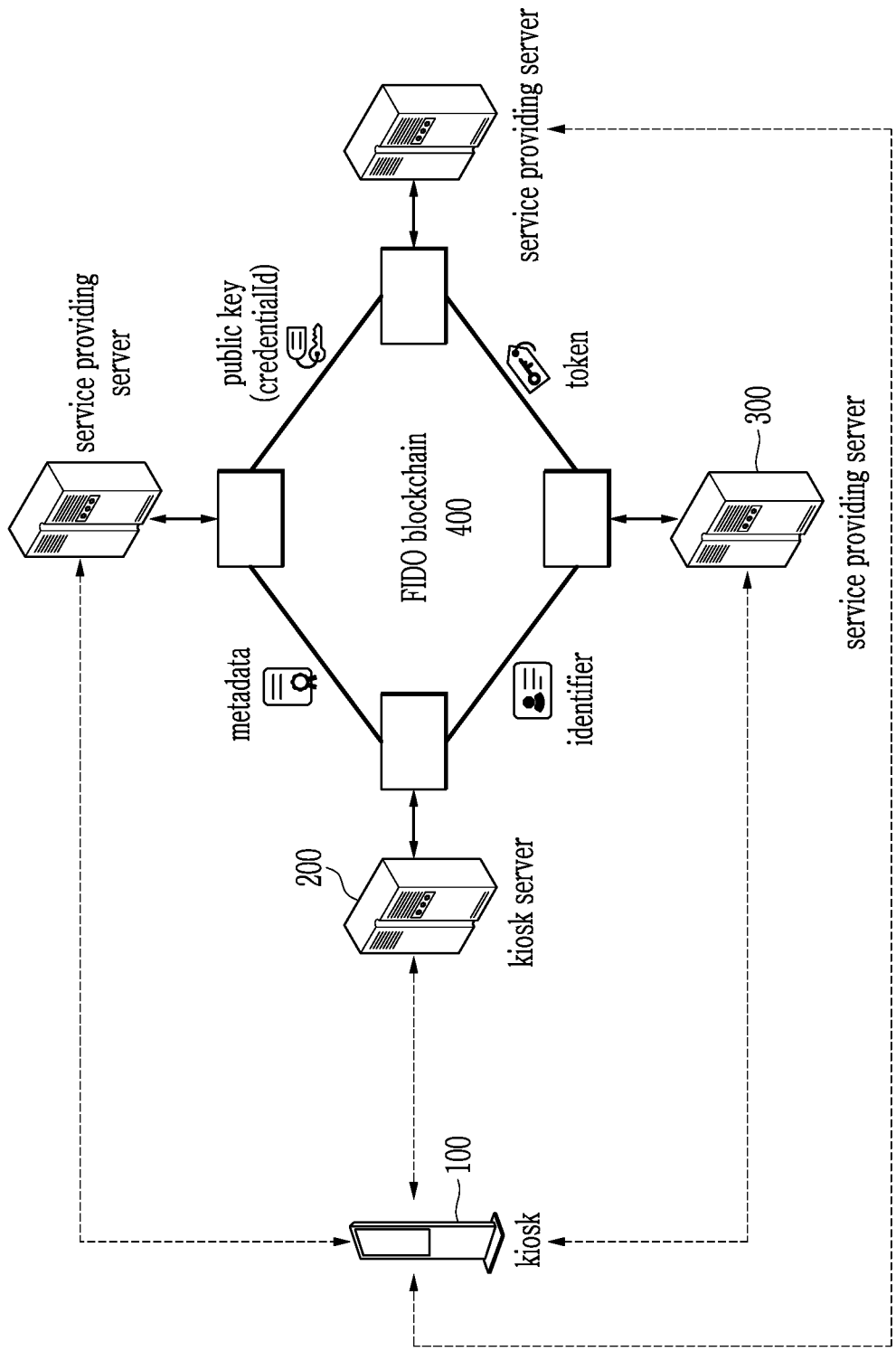
FIG. 1 is a schematic diagram illustrating a service providing system using a kiosk according to an exemplary embodiment.

In the following detailed description, only certain exemplary embodiments have been shown and described, simply by way of illustration. As those skilled in the art would realize, the described embodiments may be modified in various different ways, all without departing from the scope of the present disclosure. Accordingly, the drawings and description are to be regarded as illustrative in nature and not restrictive, and like reference numerals designate like elements throughout the specification.

FIG. 1 is a schematic diagram illustrating a service providing system using a kiosk according to an exemplary embodiment.

Referring to FIG. 1, a service providing system using a kiosk according to an exemplary embodiment includes a kiosk 100, a kiosk server 200, and a service providing server 300. In addition, the service providing system according to the exemplary embodiment may further include a fast identity online (FIDO) blockchain 400 in which the kiosk server 200 and the service providing server 300 are participants.

The kiosk 100 may be manufactured by a kiosk provider, and may be installed in a specific location and managed by a kiosk administrator. The service may be provided to end users from a service provider through the kiosk 100.

The kiosk server 200 may be operated by the kiosk provider, and used when the kiosk provider manufactures the kiosk 100 and then registers information about the kiosk 100 in the FIDO blockchain 400.

The service providing server 300 may be operated by the service provider and used when the service provider provides a service to users through the kiosk 100. In this case, the service providing server 300 may perform device authentication of the kiosk 100 through the FIDO blockchain 400. In addition, the service providing server 300 may control an access to the kiosk 100 using a device list of kiosks that can provide a specific service.

The FIDO blockchain 400 may perform a registration function and an authentication function for the kiosk 100. In addition, the FIDO blockchain 400 may verify authentication information of the kiosk 100 recorded in data blocks in the blockchain.

Figure 2:
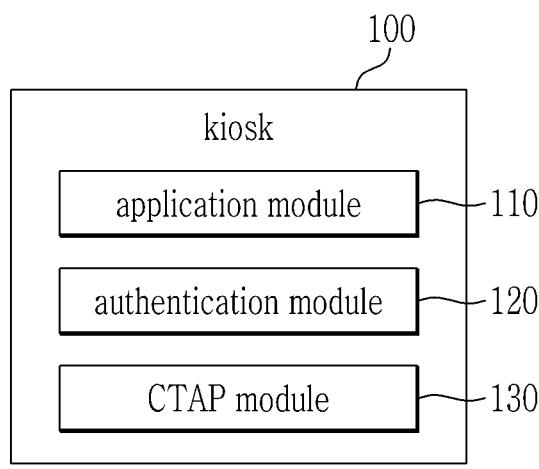
FIG. 2 is a block diagram of the kiosk according to an exemplary embodiment.

FIG. 2 is a block diagram of the kiosk according to an exemplary embodiment.

Referring to FIG. 2, a kiosk 100 according to an exemplary embodiment includes an application module 110, an authentication module 120, and a client to authenticator protocol (CTAP) module 130.

The application module 110 may include an application corresponding to each of various services that can be provided to users through the kiosk.

The authentication module 120 may generate a registration response message to register the kiosk 100 with the FIDO blockchain 400. In addition, the authentication module 120 may perform an authentication on the service providing server 300. The device authentication of the kiosk 100 to the service providing server 300 may be performed through a mechanism of FIDO or FIDO2.

The CTAP module 130 is a module used when the authentication module 120 requires an external communication (for example, Universal Serial Bus (USB), Bluetooth Low Energy (BLE), Near Field Communication (NFC), etc.). The kiosk administrator may connect the kiosk administrator's authentication equipment to the kiosk 100 through the CTAP module 130.

Figure 3:
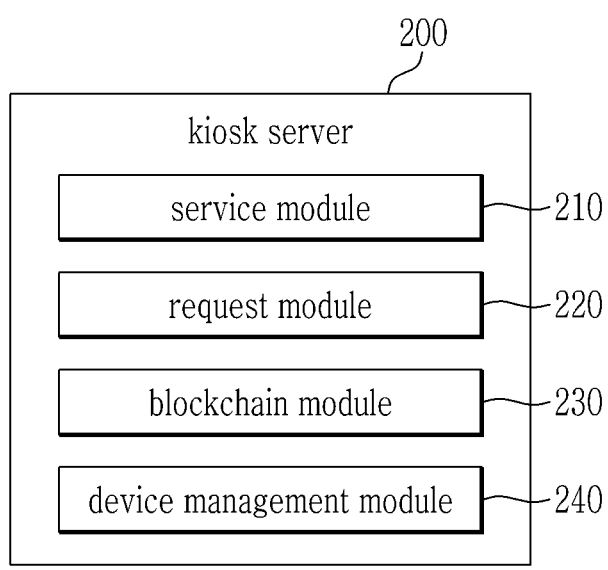
FIG. 3 is a block diagram of the kiosk server according to an exemplary embodiment.

FIG. 3 is a block diagram of the kiosk server according to an exemplary embodiment.

Referring to FIG. 3, the kiosk server 200 according to an exemplary embodiment includes a service module 210, a request module 220, a blockchain module 230, and a device management module 240.

The kiosk provider may manufacture the kiosk 100 and supply the manufactured kiosk 100 to a particular place. The kiosk 100 may be manufactured to provide various types of services provided by the service provider according to an application mounted on the application module 110. Alternatively, the kiosk 100 may provide various types of services provided by the service provider through a web browser. The kiosk server 200 may register authentication information of the kiosk 100 to the blockchain. The service providing server 300 may perform device authentication and access control on the kiosk by using the authentication information of the kiosk 100 registered to the FIDO blockchain 400.

The kiosk provider may authenticate the kiosk and perform the access control through the kiosk server 200. In this case, the kiosk server 200 may write a public key of the kiosk provider to the data block of the FIDO blockchain 400. In addition, the kiosk server 200 may write metadata information of the authentication module 120 of the kiosk 100 managed by the kiosk server 200 to the data block of the FIDO blockchain 400. The public key of the kiosk provider may be used by the service providing server 300 for non-repudiation verification of the kiosk 100 recorded in the FIDO blockchain 400 by the kiosk server 200. The metadata information of the authentication module 120 of the kiosk 100 may be used when a registration smart contract function 410 of the FIDO blockchain 400 verifies the reliability of the authentication information of the kiosk 100.

The service module 210 may receive a registration completion message regarding the kiosk 100 from the FIDO blockchain 400 and an authentication request message from the kiosk administrator. That is, the service module 210 may provide an administrator function for the kiosk 100.

The request module 220 may generate a registration request message for registering information about the kiosk 100 on the FIDO blockchain 400 and the authentication request message for authentication of the kiosk 100. In addition, the request module 220 may further transmit the generated registration request message and the authentication request message to the kiosk 100.

The blockchain module 230 may invoke smart contract functions executed by the FIDO blockchain 400 to verify a registration response message and an authentication response message received from the kiosk 100.

The device management module 240 may manage information of all the kiosks 100 managed by the kiosk server 200. If a security problem occurs in the kiosk 100, the device management module 240 may notify the service providing server 300 participating in the FIDO blockchain 400 through the blockchain module 230 that the security problem occurs. In addition, the device management module 240 may generate a device list of the kiosk 100 to be used by the service providing server 300 after the service contract between the kiosk provider and the service provider is concluded. The device list of the kiosk 100 provided to the service providing server 300 may include deviceIDs of the plurality of kiosks 100. The kiosk server 200 may encrypt the device list of the kiosk 100 with the public key of the service provider and transmit encrypted device list to the service providing server 300. That is, since the device list of the kiosk 100 is encrypted with the service provider's public key, the device list of the kiosk 100 can be decrypted by the service providing server 300 having a private key corresponding to the public key of the service provider. The public key of the service provider may be queried through the FIDO blockchain 400.

Figure 4:
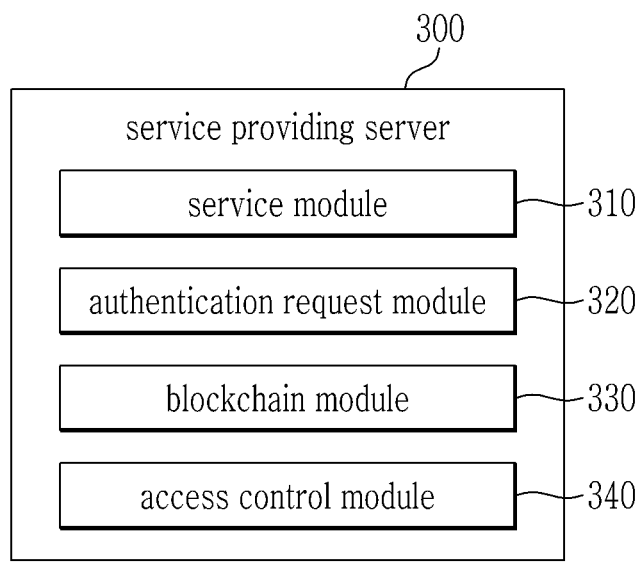
FIG. 4 is a block diagram of the service providing server according to an exemplary embodiment.

FIG. 4 is a block diagram of the service providing server according to an exemplary embodiment.

Referring to FIG. 4, the service providing server 300 according to an exemplary embodiment includes a service module 310, an authentication request module 320, a blockchain module 330, and an access control module 340.

The service providing server 300 may authenticate the kiosk 100 using the blockchain and register the public key of the service provider in the FIDO blockchain 400 to access the kiosk 100. The public key of the service provider may be used when the kiosk server 200 encrypts the device list of the kiosk 100 and transmits the encrypted device list to the service providing server 300.

The service module 310 may provide a service to users through the kiosk 100.

When a general user requests the service through the kiosk 100, the service module 310 may transmit an authentication request message to the kiosk 100 requesting the authentication of the kiosk 100.

The blockchain module 330 may invoke the smart contract functions executed by the FIDO blockchain 400 to verify the device list of the kiosk 100 and the authentication response message of the kiosk 100.

The access control module 340 may manage the device list of the kiosk 100.

Figure 5:
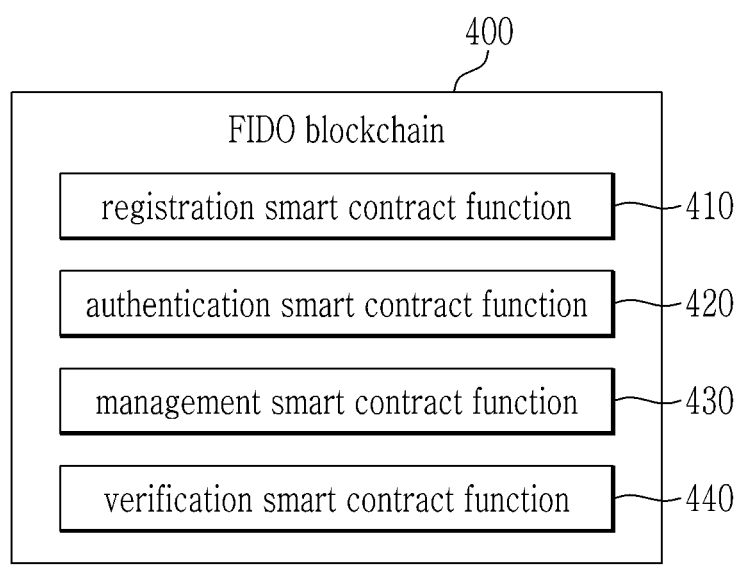
FIG. 5 is a schematic diagram illustrating functions of the FIDO blockchain according to an exemplary embodiment.

FIG. 5 is a schematic diagram illustrating functions of the FIDO blockchain according to an exemplary embodiment.

According to an exemplary embodiment, the FIDO blockchain 400 may be an open blockchain or a private blockchain. When the FIDO blockchain 400 is a private blockchain, the information shared throughout the FIDO blockchain 400 may be verified by nodes participating in the FIDO blockchain 400 (e.g., the kiosk servers of the kiosk providers or the service providing servers of the service providers). According to the exemplary embodiment, the FIDO blockchain 400 may verify a response message for the registration and the authentication of the kiosk 100 and record the authentication information of the verified kiosk 100 to the data block of the FIDO blockchain 400. In addition, the FIDO blockchain 400 may provide functions of a query, a modification, and a deletion of the authentication information of the kiosk 100 recorded in the data block. The smart contract functions of the FIDO blockchain 400 may be a program implemented based on smart contracts that can be executed in the blockchain system.

The FIDO blockchain 400 may verify the registration response message of the kiosk 100 by executing the registration smart contract function 410. When the verification of the registration response message of the kiosk 100 is completed by the registration smart contract function 410, the FIDO blockchain 400 may write the authentication information of the kiosk 100 to the data block by using a management smart contract function 430.

The FIDO blockchain 400 may verify the authentication response message of the kiosk 100 by using the authentication smart contract function 420. In this case, the FIDO blockchain 400 may verify a signature for the authentication based on the authentication information of the kiosk 100 recorded in the data block.

The FIDO blockchain 400 may again verify the authentication information of the kiosk 100 recorded in the data block by using a verification smart contract function 440.

Figure 6:
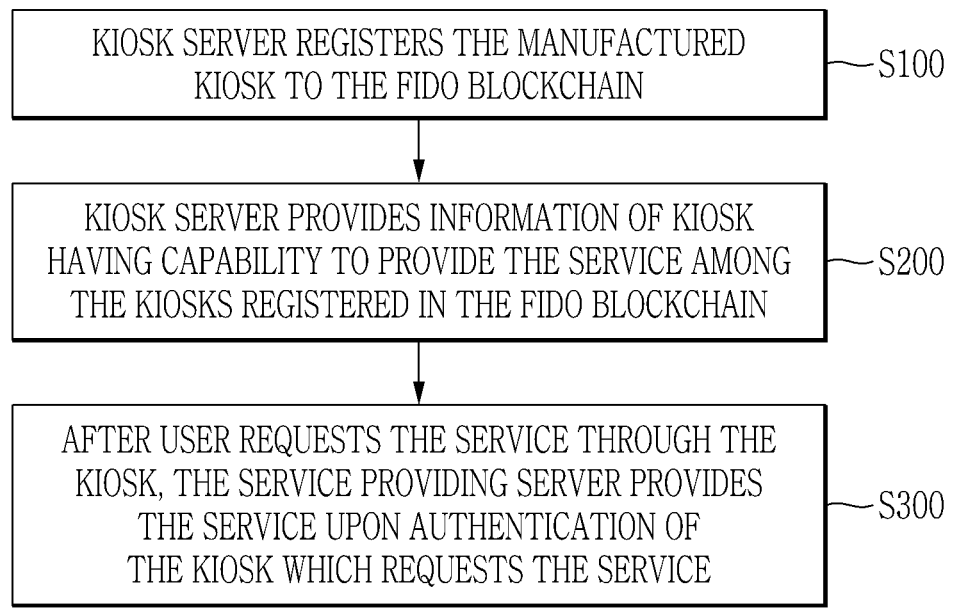
FIG. 6 is a flowchart illustrating a method for registering a kiosk and a method for providing a service through the kiosk according to an exemplary embodiment.

FIG. 6 is a flowchart illustrating a method for registering a kiosk and a method for providing a service through the kiosk according to an exemplary embodiment, FIG. 7 is a schematic diagram illustrating authentication information of a kiosk recorded in a data block of a FIDO blockchain according to an exemplary embodiment, and FIG. 8 is a schematic diagram illustrating a device list of a kiosk managed by a service providing server according to an exemplary embodiment.

Figure 9:
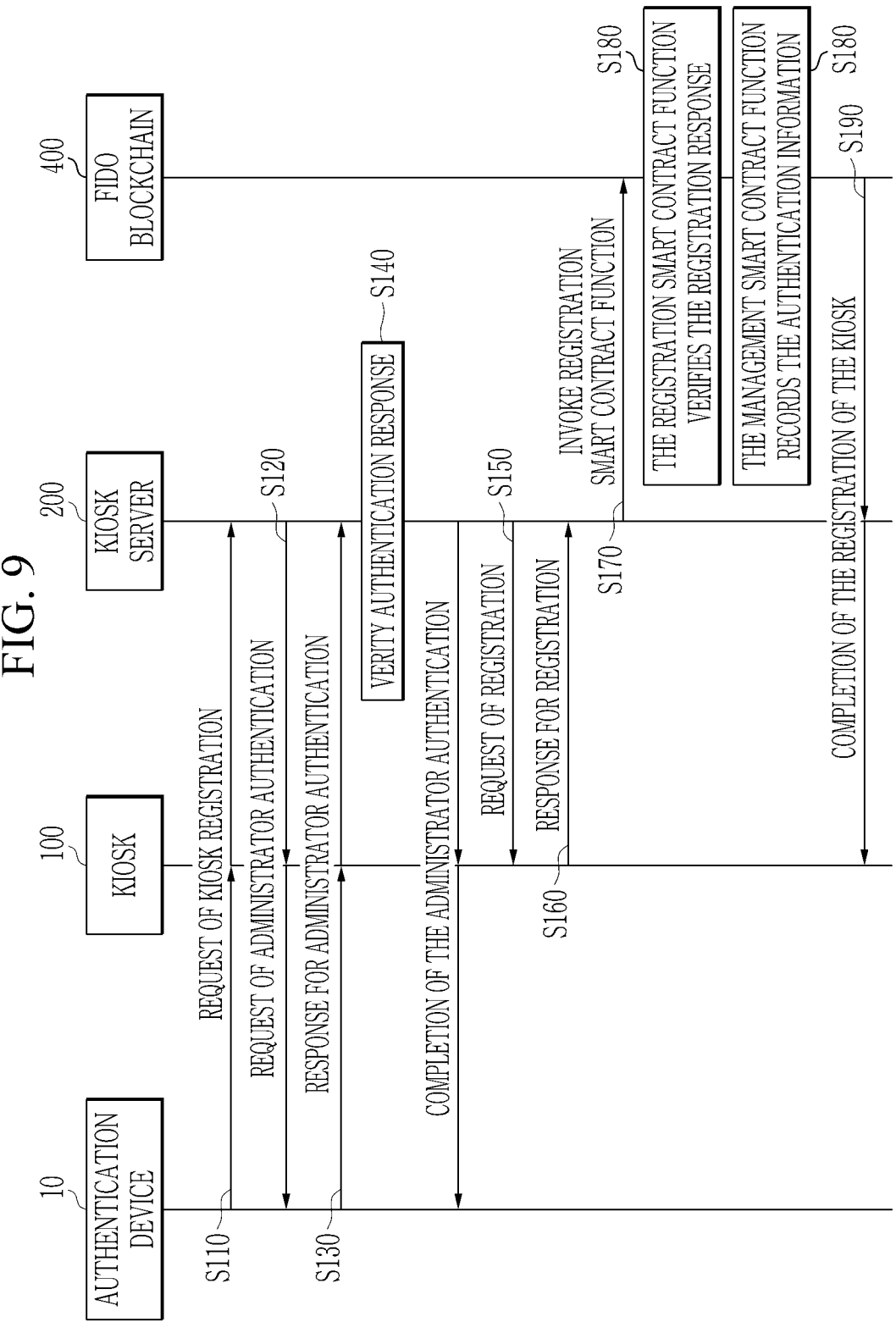
FIG. 9 is a flowchart illustrating a method for registering the kiosk with the FIDO blockchain according to an exemplary embodiment.

The kiosk server 200 registers the manufactured kiosk 100 to the FIDO blockchain 400 (S100). FIG. 9 will be described in detail below how the kiosk server 200 registers a manufactured kiosk 100 to the FIDO blockchain 400. Thereafter, the request module 220 of the kiosk server 200 may transmit a registration request message to the kiosk 100 in order to register the kiosk 100 on the FIDO blockchain 400. When a registration response message corresponding to the registration request message is received from the kiosk 100, the smart contract function of the FIDO blockchain 400 is called to verify the registration response message of the kiosk 100. The registration response message of the kiosk 100 may include the identifier of the kiosk 100, and when the registration response message of the kiosk 100 is verified by the smart contract function of the FIDO blockchain 400, the authentication information of the kiosk 100 may be recorded in the data block of the FIDO blockchain 400.

Referring to FIG. 7, the authentication information of the kiosk 100 recorded in the FIDO blockchain 400 may include AAGUID, deviceID (an identifier of the kiosk), credentialID (an identifier of a public key of the kiosk), kioskProviderID (an identifier of the kiosk provider), and serviceProviderID (an Identifier of the service provider).

The AAGUID is an identifier used when querying metadata about the authentication module 120 of the kiosk 100. The metadata of the authentication module 120 of the kiosk 100 may be recorded in the data block of the FIDO blockchain 400 by the kiosk server 200.

The deviceID is a device identifier of the kiosk 100. The deviceID may be used when the verification smart contract function of the FIDO blockchain 400 looks up a crypto (e.g., Attestation, AAGUID, credentialID). The Attestation of the crypto may be generated in the authentication module 120 of the kiosk 100. The crypto (e.g., Attestation, AAGUID, credentialID) may be generated by the kiosk server 200 by encrypting the registration response message of the authentication module 120 of the kiosk 100 with the private key of the kiosk provider.

The credentialId is an identifier used to identify information of the public key of the kiosk 100. The credentialID may be generated by the authentication module 120 of the kiosk 100.

The kioskProviderID is an identifier of the kiosk provider generated by the kiosk provider. The verification smart contract function of the FIDO blockchain 400 may query the public key of the kiosk provider recorded in the data block of the FIDO blockchain 400 by using the kioskProviderID.

The serviceProviderID is an identifier of the service provider generated by the service provider. The kiosk server 200 may query information of the public key of the service provider 300 recorded in the data block of the FIDO blockchain 400 by using the serviceProviderID.

Meanwhile, the service provider may enter into a contract with the kiosk provider to provide the service using the kiosk 100, and the kiosk server 200 may perform the access control on the kiosk 100 by providing information of the at least one kiosk having the capability to provide the service among the kiosks registered in the FIDO blockchain 400 (S200). The access control method for the kiosk 100 of the service providing server 300 is described in detail below with reference to FIG. 10 below. Thereafter, the access control module 340 of the service providing server 300 may store and manage kiosk information provided from the kiosk server 200 as the device list.

Referring to FIG. 8, the device list of the kiosks managed by the service providing server 300 is shown. The device list of the kiosks may include kioskProviderID, deviceID, credentialID, and credentialType (a type of the public key of the kiosk). The credentialID is an identifier of the public key generated by the kiosk 100 for authentication. The identifier of the kiosk provider (kioskProviderID) is identifier information that is used when the verification smart contract function 440 invoked by the service providing server 300 queries the public key of the kiosk provider in the data block. The list of kiosks 100 that can provide the service may be managed in the form of the device list.

Figure 11:
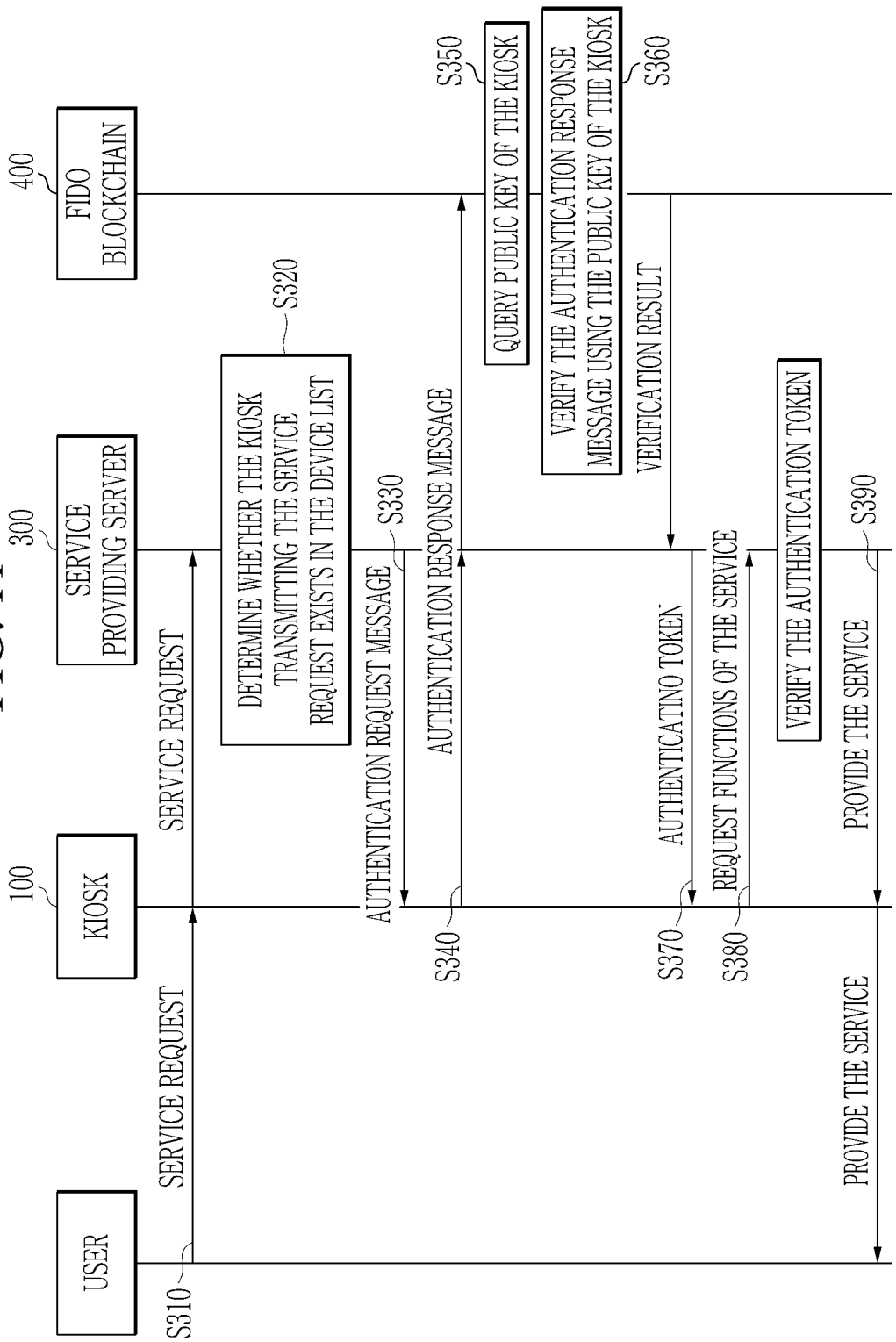
FIG. 11 is a flowchart illustrating a service providing method of a service provider according to an exemplary embodiment.

Thereafter, the users may receive the service through the kiosk 100. A general user may request the service through the kiosk 100 and receive the service from the service providing server 300 after the authentication of the kiosk 100 is performed (S300). FIG. 11 will illustrate in detail below how the service providing server 300 provides the service through the kiosk 100. The kiosk 100 may transfer the service request of the user to the service providing server 300, and the service providing server 300 may request the kiosk 100 for authentication as to whether the kiosk is a kiosk capable of providing the service requested by the user. When the service providing server 300 receives the authentication response message from the kiosk 100, the service providing server 300 may check the data block of the FIDO blockchain 400 to determine whether the information of the corresponding kiosk 100 is included in the device list. The service providing server 300 may invoke the authentication smart contract function 420 of the FIDO blockchain 400 to verify the authentication response message of the kiosk 100. After that, when the authentication response message of the kiosk 100 is verified by the authentication smart contract function 420 and the information of the kiosk 100 which has transmitted the authentication response message is included in the device list stored in the data block of the FIDO blockchain 400, the service providing server 300 may provide the requested service to the user through the kiosk 100.

FIG. 9 is a flowchart illustrating a method for registering the kiosk with the FIDO blockchain according to an exemplary embodiment.

The kiosk provider needs to register all the kiosks 100 manufactured by the kiosk provider with the FIDO blockchain 400. To this end, the kiosk server 200 may record the metadata about the authentication module 120 in the kiosk 100 to the FIDO blockchain 400. When the kiosk server 200 records the metadata of the authentication module 120 in the FIDO blockchain 400, the kiosk server 200 may set AAGUID, which is the identifier of the authentication module 120, as KEY and set the metadata as VALUE.

The kiosk administrator may connect the authentication device 10 kiosk administrator to the kiosk 100 through the CTAP module 130 of the kiosk 100, and the authentication device 10 kiosk administrator may request a registration of the kiosk 100 to the kiosk server (200) by using the kiosk administrator ID (S110). The kiosk administrator is an entity who manages the kiosk 100 at the point where the kiosk 100 is installed. The kiosk server 200 which receives the request of the registration kiosk including the kiosk administrator ID may request the authentication of the administrator through the kiosk 100 (S120). The Authentication of the kiosk administrator may correspond to the authentication of the authentication device 10 of the kiosk administrator. The authentication device 10 of the kiosk administrator may transmit an administrator authentication response message to the kiosk server 200 after receiving an administrator authentication request message through the kiosk 100 (S130). The kiosk server 200 may verify the authentication device 10 of the kiosk administrator based on the administrator ID included in the authentication response message of the kiosk administrator (S140).

After the authentication of the kiosk administrator is completed, the kiosk server 200 may register the kiosk 100 on the FIDO blockchain 400 by using the kiosk ID of the kiosk 100. First, the kiosk server 200 may transmit a request message for the registration of the kiosk 100 to the kiosk 100 (S150). The authentication module 120 of the kiosk 100 may transfer a registration response message to the kiosk server 200 (S160). The registration response message generated by the authentication module 120 of the kiosk 100 may include the Attestation.

The kiosk server 200 may request execution of the registration smart contract function 410 of the FIDO blockchain 400 and verify the registration response message of the kiosk 100 (S170). When the verification of the registration response message of the kiosk 100 is completed, the FIDO blockchain 400 may execute the management smart contract function 430 for the kiosk 100 and record the authentication information of the kiosk 100 to the data block of the FIDO blockchain 400 (S180). At this time, the authentication information of the kiosk 100 recorded in the data block may be the deviceID and the credentialID of FIG. 8. The Information recorded as the VALUE of the deviceID (i.e., crypto (Attestation, AAGUID, credentialID)) may be encrypted with the private key of the kiosk server 200 and stored in the FIDO blockchain 400. In FIG. 8, the AAGUID, the kioskProviderID, and the serviceProviderID may be information recorded in the FIDO blockchain 400 before registration of the kiosk 100. Thereafter, the FIDO blockchain 400 may transmit a registration completion message indicating that the registration of the kiosk 100 is completed to the kiosk 100 via the kiosk server 200 (S190).

Figure 10:
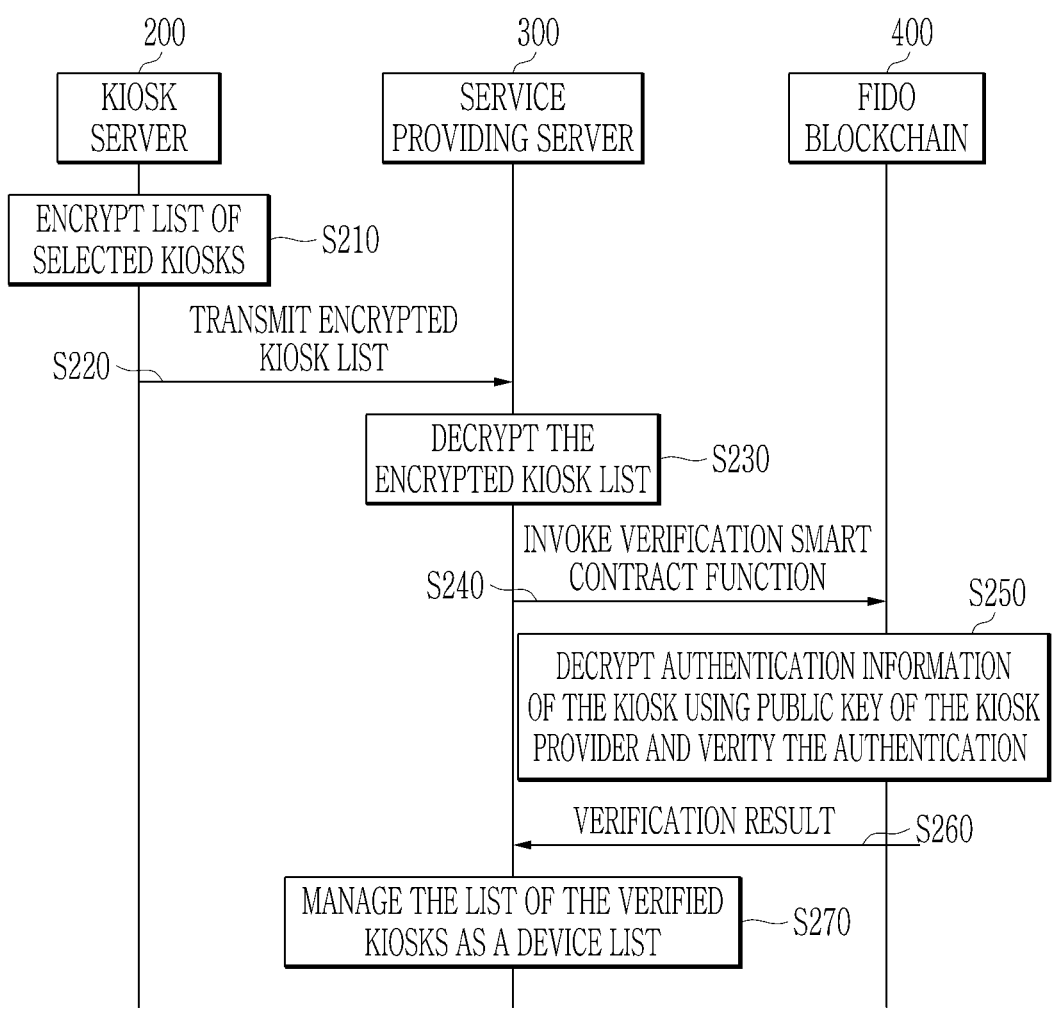
FIG. 10 is a flowchart illustrating a method for access control for the kiosk of the service provider according to an exemplary embodiment.

FIG. 10 is a flowchart illustrating a method for access control for the kiosk of the service provider according to an exemplary embodiment.

A service provider who wants to provide services to a general user through a kiosk needs to secure a plurality of kiosks installed at specific locations. Therefore, the service provider may enter into a contract with a kiosk provider who manages the plurality of kiosks installed and operated in the specific locations. When the service provider selects the plurality of kiosks by the contract, the kiosk server 200 may encrypt a list of selected kiosks using the public key of the service provider (S210) and transmit the encrypted kiosk list to the service providing server 300 (S220). The public key of the service provider may be queried in the FIDO blockchain 400 based on the serviceProviderID which is the identifier of the service provider.

The service providing server 300 may decrypt the encrypted kiosk list with its private key (S230). The service providing server 300 then may invoke a verification smart contract function 440 of the FIDO blockchain 400 to determine whether information about the kiosks in the kiosk list which is provided by the kiosk server 200 is registered in the FIDO blockchain 400 and whether authentication information of the kiosk registered in the FIDO blockchain 400 is valid (S240). The service providing server 300 may transmit the kioskProviderID of the kiosk provider to the module 440 when requesting the verification to the verification smart contract function 440. The verification smart contract function 440 may query the public key of the kiosk provider recorded in the FIDO blockchain 400 by using the kioskProviderID of the kiosk provider. Accordingly, the verification smart contract function 440 may decrypt information of the kiosk 100 (e.g., crypto (Attestation, AAGUID, credentialID)) that is encrypted with the private key of the kiosk provider by using the public key of the kiosk provider. The verification smart contract function 440 may verify decrypted authentication information of the kiosk 100 (S250). When the authentication information of the kiosk 100 is verified by the verification smart contract function 440, the FIDO blockchain 400 may transmit the verification result to the service providing server 300 (S260). Then, the service providing server 300 may manage the list of the verified kiosks 100 as a device list (S270).

FIG. 11 is a flowchart illustrating a service providing method of a service provider according to an exemplary embodiment.

The user may request a service through the kiosk 100 in order to use the service to be provided by the kiosk 100 (S310). The service providing server 300 receiving the user's service request from the kiosk 100 may determine whether the kiosk 100 that has transmitted the user's service request exists in the device list (S320). According to an exemplary embodiment, the verification may be performed by the FIDO authentication or the FIDO2 authentication. For example, in order to process FIDO2 authentication, the service providing server 300 may query the kiosk 100 in the device list managed by the access control module 340. Thereafter, when the kiosk 100 that transmits the service request exists in the device list, the service providing server 300 may transmit an authentication request message to the kiosk 100 that transmitted the service request (S330). The kiosk 100 receiving the authentication request message from the service providing server 300 may generate an authentication response message and transmit the generated authentication response message to the FIDO blockchain 400 via the service providing server 300 (S340). In this case, the service providing server 300 may invoke the authentication smart contract function 420 of the FIDO blockchain 400 to verify the authentication response of the kiosk 100. The authentication smart contract function 420 of the FIDO blockchain 400 may query the public key of the kiosk 100 registered as the credentialId in the data block of the FIDO blockchain 400 (S350), and verify the authentication response message of the kiosk 100 using the public key (S360). When the authentication response message is verified, the service providing server 300 may confirm that the kiosk 100 requesting the service is a kiosk capable of providing the service to the user. Thereafter, the service providing server 300 may generate an authentication token for providing the service to the user and transmit the generated authentication token to the kiosk 100 (S370). The kiosk 100 receiving the authentication token from the service providing server 300 may request functions of the service using the authentication token (S380), and provide the service received after the authentication token is verified by the service providing server 300 to the user (S390).

Figure 12:
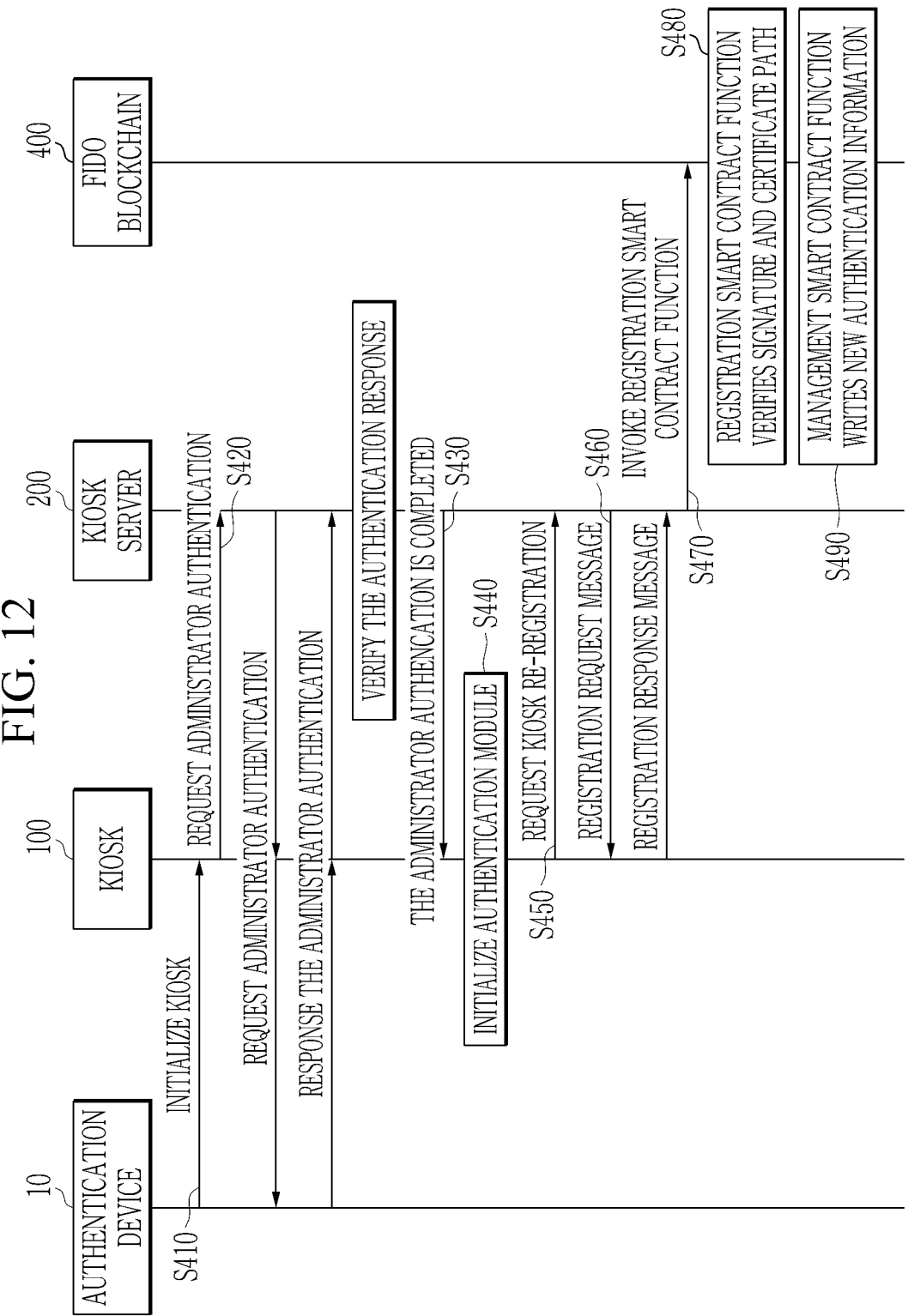
FIG. 12 is a flowchart illustrating a method for modifying authentication information of a kiosk according to an exemplary embodiment.

FIG. 12 is a flowchart illustrating a method for modifying authentication information of a kiosk according to an exemplary embodiment.

If a security problem occurs in the kiosk 100, the kiosk server 200 may initialize authentication information of the kiosk 100, generate new authentication information of the kiosk 100, and register the new authentication information to the FIDO blockchain 400.

Referring to FIG. 12, when a security problem occurs in the kiosk 100, the kiosk administrator may connect the kiosk administrator's authentication device 10 to the kiosk 100 and transmit, to the kiosk 100, a command to initialize the kiosk 100 (S410). When the initialization command for the kiosk 100 is received from the kiosk administrator, the kiosk 100 may request the kiosk server 200 to authenticate the kiosk administrator (S420). When the kiosk administrator is authenticated by the kiosk server 200 (S430), the kiosk 100 may initialize the authentication module 120 (S440). The kiosk 100 may request the kiosk server 200 to re-register the kiosk 100 to the FIDO blockchain 400 by using the deviceID of the kiosk 100 (S450). The kiosk server 200 may transmit a registration request message to the kiosk 100 for re-registering authentication information of the kiosk 100 to the FIDO blockchain 400 (S460). The kiosk 100 may generate and send a registration response message corresponding to the registration request message to the kiosk server 200, and the kiosk server 200 may invoke a registration smart contract function of the FIDO blockchain 400 to verify the registration response message. The registration smart contract function 410 of the FIDO blockchain 400 may look up new authentication information (including metadata) of the kiosk 100, which is included in the registration response message, and verify the signature and the certificate path (S480). When the signature and the certificate path are verified, the management smart contract function 410 of the FIDO blockchain 400 may write new authentication information of the kiosk 100 in the data block of the FIDO blockchain 400 (S490).

As described above, by using the blockchain to authenticate the kiosks and control access to the kiosks, various services can be securely provided to the users via the kiosks. In addition, maintenance costs for the kiosks at the service provider can be dramatically reduced.

Figure 13:
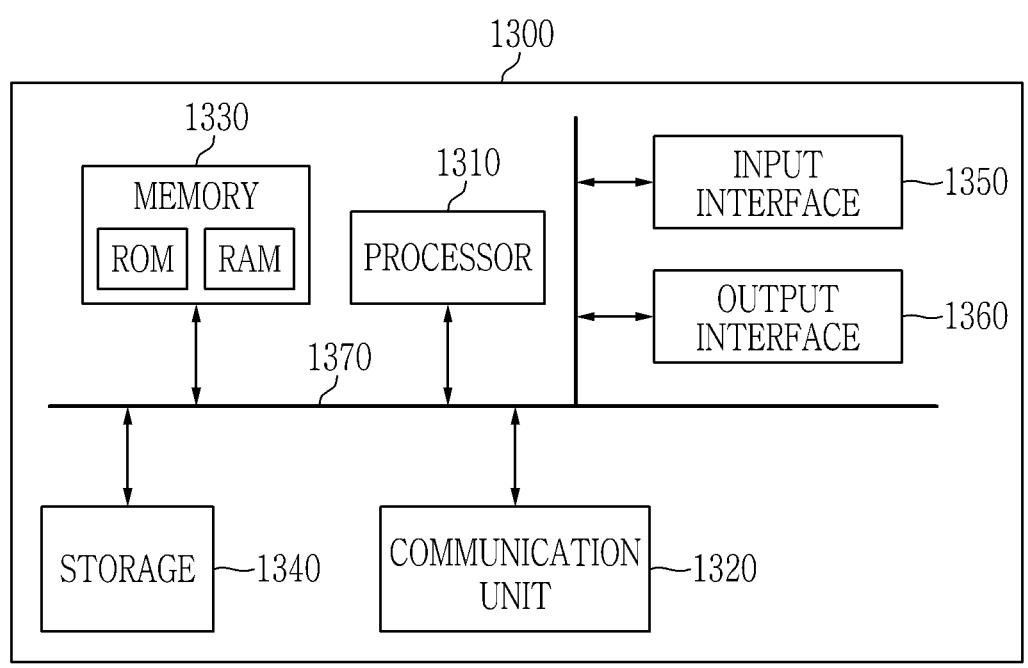
FIG. 13 is a block diagram illustrating a service providing system using a kiosk according to another exemplary embodiment.

FIG. 13 is a block diagram illustrating a service providing system using a kiosk according to another exemplary embodiment.

The service providing system according to another exemplary embodiment may be implemented as a computer system, for example a computer readable medium. Referring to FIG. 13, a computer system 1300 may include at least one of processor 1310, a memory 1330, an input interface 1350, an output interface 1360, and storage 1340. The computer system 1300 may also include a communication unit 1320 coupled to a network. The processor 1310 may be a central processing unit (CPU) or a semiconductor device that executes instructions stored in the memory 1330 or storage 1340. The memory 1330 and the storage 1340 may include various forms of volatile or non-volatile storage media. For example, the memory may include read only memory (ROM) 1331 or random access memory (RAM) 1332. In the exemplary embodiment of the present disclosure, the memory may be located inside or outside the processor, and the memory may be coupled to the processor through various means already known.

Thus, embodiments of the present invention may be embodied as a computer-implemented method or as a non-volatile computer-readable medium having computer-executable instructions stored thereon. In the exemplary embodiment, when executed by a processor, the computer-readable instructions may perform the method according to at least one aspect of the present disclosure. The communication unit 1320 may transmit or receive a wired signal or a wireless signal.

On the contrary, the embodiments of the present invention are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like. Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method for providing a service using a kiosk by a service providing server, the method comprising:
   receiving a device list of at least one kiosk having an ability to provide the service among a plurality of kiosks registered in a blockchain from a kiosk server;
   authenticating a first kiosk through a smart contract function embedded in the blockchain when a user requests the service through the first kiosk and determining whether the first kiosk is included in the device list; and
   providing the service to the user when the first kiosk is authenticated by the smart contract function and is included in the device list,
   wherein the receiving a device list of at least one kiosk having an ability to provide the service among a plurality of kiosks registered in a blockchain from a kiosk server includes:
   receiving a kiosk list encrypted with a public key of a service provider from the kiosk server and decrypting the encrypted kiosk list based on a private key of the service provider; and
   verifying kiosks in the kiosk list by invoking a verification smart contract function of the blockchain and managing verified kiosks using the device list.

2. The method of claim 1, wherein
   the device list includes an identifier of a kiosk provider, an identifier of a kiosk, an identifier of a public key of the kiosk, and a type of the public key of the kiosk.

3. The method of claim 2, wherein
   the identifier of the kiosk provider is used when a verification smart contract function of the blockchain which is invoked by the service providing server queries the public key of the kiosk provider in a data block of the blockchain.

4. The method of claim 2, wherein
   the identifier of the public key of the kiosk is used when an authentication smart contract function of the blockchain which is invoked by the service providing server queries the public key of the kiosk in a data block of the blockchain.

5. The method of claim 1, wherein
   the providing the service to the user when the first kiosk is authenticated by the smart contract function and is included in the device list includes:
   transmitting an authentication token for providing the service to the first kiosk; and
   providing the service by verifying the authentication token received from the first kiosk when a function of the service is requested through the authentication token from the first kiosk.

6. The method of claim 1, wherein an identifier of a public key of the kiosk is registered in a data block of the blockchain and the authenticating the first kiosk comprises querying the registered identifier of the public key of the kiosk.

7. The method of claim 1, further comprising using metadata information of an authentication module of the first kiosk to verify authentication information of the first kiosk using a registration smart contract function of the blockchain, the authentication information including an identifier of a kiosk provider, an identifier of the kiosk, an identifier of a public key of the kiosk, and an identifier used to query the metadata information.

8. A server which provides a service using a kiosk, the server comprising:
a processor, a memory, and a communication device, wherein the processor executes a program stored in the memory to perform:
receiving a device list of at least one kiosk having an ability to provide the service among a plurality of kiosks registered in a blockchain through the communication device from a kiosk server;
authenticating a first kiosk through a smart contract function embedded in the blockchain when a user requests the service through the first kiosk and determining whether the first kiosk is included in the device list; and
providing the service to the first kiosk through the communication device so that the service is used by the user when the first kiosk is authenticated by the smart contract function and is included in the device list,
wherein when the processor performs the receiving the device list of the at least one kiosk from the kiosk server, the processor performs:
receiving a kiosk list encrypted with a public key of a service provider from the kiosk server and decrypting the encrypted kiosk list based on a private key of the service provider; and
verifying kiosks in the kiosk list by invoking a verification smart contract function of the blockchain and managing verified kiosks using the device list.

9. The server of claim 8, wherein
the device list includes an identifier of a kiosk provider, an identifier of a kiosk, an identifier of a public key of the kiosk, and a type of the public key of the kiosk.

10. The server of claim 9, wherein
the identifier of the kiosk provider is used when a verification smart contract function of the blockchain which is invoked by the service providing server queries the public key of the kiosk provider in a data block of the blockchain.

11. The server of claim 9,
the identifier of the public key of the kiosk is used when an authentication smart contract function of the blockchain which is invoked by the service providing server queries the public key of the kiosk in a data block of the blockchain.

12. The server of claim 8, wherein
when the processor performs the providing the service to the user when the first kiosk is authenticated by the smart contract function and is included in the device list, the processor performs:
transmitting an authentication token through the communication device for providing the service to the first kiosk; and
providing the service by verifying the authentication token received from the first kiosk when a function of the service is requested through the authentication token from the first kiosk.

13. A kiosk server which manages a kiosk providing a service to a user, the kiosk server comprising:
a processor, a memory, and a communication device, wherein the processor executes a program stored in the memory to perform:
authenticating an administrator by requesting an authentication to the administrator of the kiosk when a registration request for the blockchain is received from the kiosk;
receiving a registration response message from the kiosk when the administrator is authenticated; and
verifying the registration response message by invoking a registration smart contract function of the blockchain and receiving a registration completion message indicating that a registration of the kiosk is completed from the blockchain when the registration response message is verified by the registration smart contract function;
wherein
authentication information of the kiosk recorded in a data block of the blockchain when the kiosk is registered to the blockchain includes an identifier of a kiosk provider, an identifier of the kiosk, an identifier of a public key of the kiosk, a type of the public key of the kiosk, and an identifier used to query metadata information of an authentication module of the kiosk.

14. The kiosk server of claim 13, wherein
when the processor performs the authenticating an administrator by requesting an authentication to the administrator of the kiosk when a registration request for the blockchain is received from the kiosk, the processor performs
verifying an authentication device of the administrator based on an identifier of the administrator included in an authentication response when the authentication response corresponding to the requesting is received from the administrator, wherein
the authentication device has been connected to the kiosk by the administrator.

\* \* \* \* \*